Figure 1:
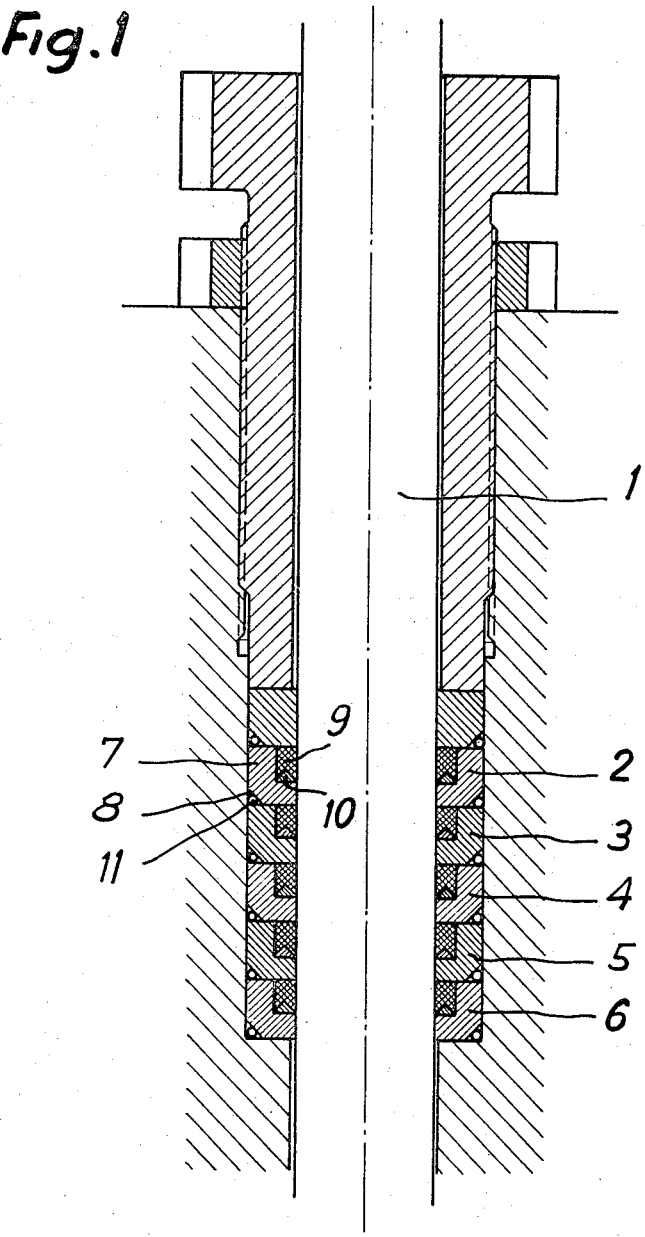

United States Patent
Dumazet

[11] 3,801,112
[45] Apr. 2, 1974

[54] GLAND PACKINGS

[75] Inventor: Eugène Dumazet, Sainte Catherine les Aaras, France

[73] Assignee: Ethylene-Plastique, Courbevoie, France

[22] Filed: May 11, 1971

[21] Appl. No.: 142,138

[30] Foreign Application Priority Data
May 13, 1970 France.............................. 70.17516

[52] U.S. Cl................................. 277/124, 277/190
[51] Int. Cl............................................ B65d 53/02
[58] Field of Search ........... 277/112, 123, 124, 125, 277/190

[56] References Cited
UNITED STATES PATENTS
3,316,940   5/1967   Gratzmuller..................... 277/125 X
2,139,218   12/1938   Asai..................... 277/112
2,430,836   11/1947   Taylor............................. 277/124 X FOREIGN PATENTS OR APPLICATIONS
1,068,721   5/1967   Great Britain...................... 277/124
986,992   3/1965   Great Britain...................... 277/125

Primary Examiner—Meyer Perlin
Assistant Examiner—Ronald C. Capossela
Attorney, Agent, or Firm—Fitzpatrick, Cella, Harper & Scinto

[57] ABSTRACT

A gland packing especially for use in a valve having a rotatable or axial movable spindle in which the packing is constituted by a series or stack of separate or independent packing sections. Each section consists of a dished ring, a washer packing, a spacer ring and a toric ring. The dished ring at its bottom and outer edge is provided with a 45° chamfer. The packing washer has an outer diameter equal to the internal diameter of the dished ring and an internal diameter equal to the diameter of the movable spindle and is also formed on its bottom surface with a V-notch into which the spacer ring can engage for expansion purposes. The toric ring is housed in the chamfer of the dished ring.

4 Claims, 2 Drawing Figures

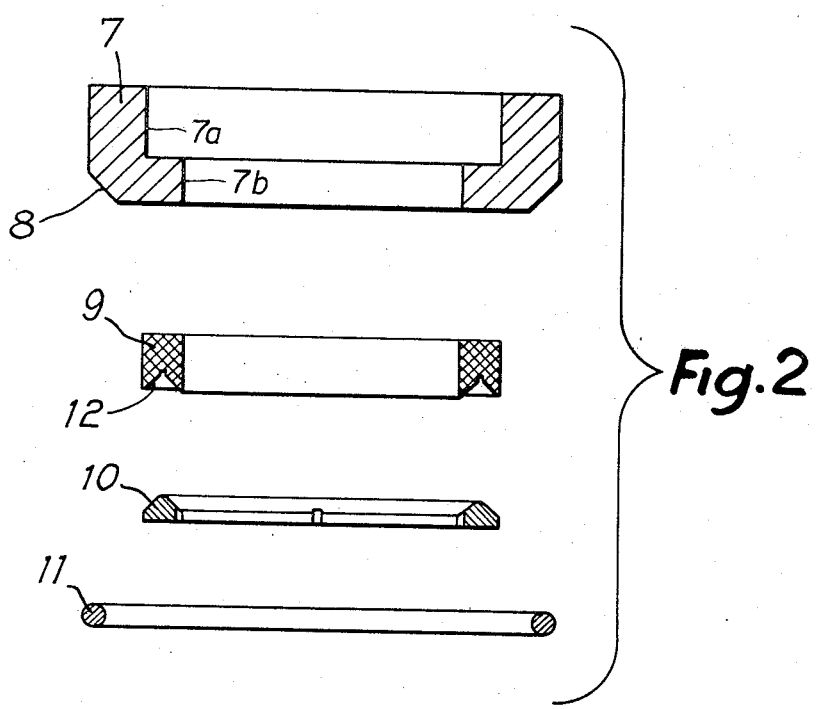

GLAND PACKINGS

This invention relates to gland packings for movable shafts having special use in valves intended for the control of fluids under high pressure.

The gland packing according to the present invention comprises a plurality of independent sections, each constituted by (1) a dished ring comprising at its lower part and on its outer periphery a 45° chamfer, (2) a washer packing of deformable material, of cylindrical shape, the outer diameter of which is equal to the internal diameter of the dished ring, the internal diameter of which is equal to the diameter of the movable spindle rod and which has on its internal surface a circular notch in the shape of an inverted V, (3) a steel spacing ring engageable in the inverted V of the washer packing, in order to expand same, by gripping the latter, and (4) a toric ring of pure copper, which is housed in the chamfer of the dished ring.

The present invention will be more easily understood by means of FIGS. 1 and 2 which illustrate respectively by way of example, a valve provided with a gland packing according to the invention, and the various components of the gland packings.

FIG. 1 shows the top of a valve according to the invention provided with a gland packing constituted by five packing sections. There is shown at 1 the spindle or rod of the valve which can be displaced rotatably or axially; at two, three, four, five and six there is shown the five packing sections according to the invention; at seven there is shown a dished ring having at its lower part and on its outer periphery a chamfer eight, at nine a washer packing, at ten a spacer ring and at 11 a toric ring.

The various parts of each packing section are shown in FIG. 2. In this Figure, there is shown at 7 the dished ring having first and second inner diameters 7a and 7b, respectively, and at its lower part and on its outer periphery a 45° chamfer 8. In order to give some indication of the dimensions of this dished ring 7, it can be stated that, for a spindle or rod of 25 mm diameter, the outer diameter of the ring is of the order of 42 mm, its height is about 10 mm and the internal diameter of the dish is of the order of 32.5 mm. This dished ring 7 can be machined, for example, from hard, treated steel.

In this figure, there is also shown at 9 the washer packing which fits into the dish of the ring 7. This washer has an outer diameter of 32.5 mm (equal to the internal diameter of the dish of the ring 7, apart from the play), an internal diameter of 25 mm (equal to the diameter of the spindle or rod of the valve apart from 0.01 mm). The washer packing 9 comprises at its bottom surface a notch 12 in the form of an inverted V, the angle of aperture of the V being about 90°. The height of this washer packing is about 5.2 mm whereas the depth of the dished ring 7 is about 6 mm. This washer packing is preferably made of Teflon, filled with bronze and molybdenum disulphide.

There is shown at 10 the spacer ring which, by engagement in the notch 12, separates the lips of the notch 12. The height of this spacer ring 10 is about 0.8 mm and it is made of steel.

There is shown at 11 the toric ring made of annealed pure copper; its average diameter is 40 mm and the diameter of the copper is 2 mm.

The assembly of valves employing gland packings according to the invention can take place in various ways.

According to one embodiment, the body of the stuffing box receives a stack of packing sections according to the invention. The toric rings 11 are tightened and crushed until the dished rings 7 are firmly pressed against each other, metal to metal. The washer packings 9 undergo a compression, the amplitude of which is perfectly defined. They open on the spacer rings 10 and are applied against the spindle or rod to be sealed, exerting on it a defined and limited pressure. Thus, at rest, with a zero fluid pressure, the spindle or rod to be made fluid tight is subjected to a notable compression exerted by the deformed washer packings.

According to a preferred embodiment of the invention, the gland packing less the toric rings 11 is mounted on a spindle or rod, the diameter of which is strictly equal to that of the spindle or rod of the valve to be packed, and the packing sections are compressed against each other in the manner of a vice. After loosening, the washer packings 9 are then cut off to the level of the corresponding dished rings 7. The gland packing is then mounted in the body of the stuffing box, a toric ring 11 of pure, annealed copper being inserted under each of the dished rings 7.

In this case, with zero fluid pressure, the spindle or rod to be made fluid tight supports practically only the initial compression force, due to the packing.

When the pressure of the fluid is exerted the latter, penetrating between the spacer ring 10 and the washer packing 9 of the first section, presses the latter very firmly against the spindle or rod to be made fluid tight, thus ensuring fluid tightness. If the latter is not complete, or, due to wear, is no longer perfect, the second packing section takes over.

The packing according to the invention can be used, in fact, over a very large range of pressures and it may be used in particular for shafts which are continuously moving such as the shafts of rotary pumps or piston pumps.

What is claimed is:

1. A gland packing section for use with a movable spindle comprising a dished ring having first and second inner diameters and at its lower part and on its outer periphery a 45° chamfer, a washer packing of deformable material, of cylindrical shape, the outer diameter of which is equal to the first inner diameter of the dished ring and the inner diameter of which is equal to the diameter of the movable spindle and which has on its lower surface a circular notch in the form of an inverted V, a steel spacer ring engageable in the inverted V of the washer packing in order to separate, by a tightening action the latter, and a toric ring of pure copper which fits in the chamfer of the dished ring.

2. A gland packing for a movable spindle, and more particularly for the spindles of high pressure valves, the gland packing comprising a plurality of separate sections, each comprising a dished ring having first and second inner diameters and at its lower part and on its outer periphery a 45° chamfer, a washer packing of deformable material, of cylindrical shape, the outer diameter of which is equal to the first inner diameter of the dished ring and the inner diameter of which is equal to the diameter of the movable spindle and which has on its lower surface a circular notch in the form of an inverted V, a steel spacer ring engageable in the inverted V of the washer packing in order to separate, by a tightening action the latter, and a toric ring of pure copper which fits in the chamfer of the dished ring.

3. A gland packing according to claim 2, in which the dished ring and the spacer ring are made of steel, the deformable washer is made of Teflon filled with bronze and molybdenum disulphide and the toric ring is made of copper.

4. Machinery comprising a movable spindle surrounded by a gland packing as claimed in claim 2.

* * * * *